Figures 1, 2, 3:
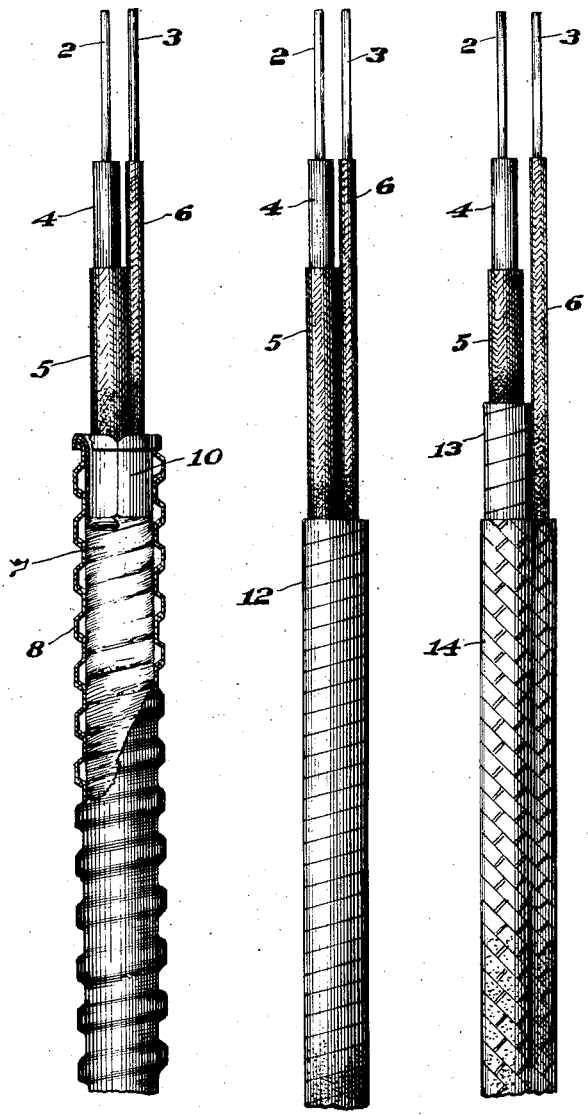

Patented Feb. 9, 1937

2,070,141

UNITED STATES PATENT OFFICE 2,070,141

ELECTRIC CABLE

William C. Robinson, Sewickley, Pa., and Otto A. Frederickson, Glen Ridge, N. J.

Application July 27, 1935, Serial No. 33,470

3 Claims. (Cl. 173—266)

In distributing electric current to ultimate consumers it has been the practice to use fully insulated wires to conduct the current in the circuits in which the current consuming devices are located. As the distribution systems grew in size, and consequently become more subject to disturbances produced by lightning, line surges, and the like, very serious troubles were encountered, such as fires and personal injuries, due to the break down of insulation and the entrance of high voltages to the low voltage distributing circuits. Many of these troubles were caused by insulation break downs in the transformers. These difficulties ultimately led to the practice of "grounding the neutral." That is, connecting one terminal of the transformer to the ground. Thus under normal conditions one conductor of the low voltage distribution system was of the same potential as the ground on open circuit and carried only a very slightly higher potential on a closed circuit. The potential difference between this wire and the other wire or wires could not, in any event, exceed the working voltage.

While this practice was started some thirty-five or more years ago and at first met with much resistance, the merits of this system gradually gained recognition and for many years this practice has been made mandatory by the National Electrical code. At present and for many years, the code has always required that all circuit conductors carry the same insulation, adequate for the working voltages. Where the conductors are enclosed in conduits or metal armor, these metal parts must be grounded, usually to a water pipe, gas pipe, or the like. The neutral wire is grounded at the transformer but the neutral circuit conductors inside a dwelling or other building, and which are connected directly to this grounded neutral wire, carry the same insulation as do the other wire or wires of the circuit.

With a view to reducing the cost of wiring a building, and recognizing the fact that both the armor or metal conduit and the neutral circuit wire are connected to the ground, it was proposed to eliminate the insulation on the latter wire and to use a bare wire in place of it. This proposal was made many years ago, but it has never been accepted by the Fire Underwriters or the code authorities. It was recognized at once that while such a change would be entirely safe and serviceable from a purely electrical distribution standpoint, and it was, therefore, strongly urged by the power companies, it was opposed with equal vigor by the water and gas companies to whose pipes the grounding connections were made, for the very good reason, among others, that this neutral circuit wire would be in contact with metal parts at various points in the circuit, and that, consequently, the return current would flow not merely through the wire itself, but through alternative paths provided by the pipes, the metal of buildings in which metal frames were used, and other paths difficult to trace. The bare fact that these metal parts carried the current was not objectionable, but it was well known that corrosion would occur at the points where the current left these metal members. The results of such action were common experiences of the water and gas companies, and any concern maintaining metal underground structures. The plumbing associations opposed the suggested change for the same reason. The building authorities likewise objected because of the danger of corrosion to rivets and to other parts of the metal members, particularly those at the foundation.

This controversy has raged for a score or more of years, both in the United States and abroad, but the authorities have never accepted the proposed change, and as a result the fully insulated wiring system is still required by the code.

The present invention is especially concerned with the conditions involved in the controversy above described, and it aims to devise a wiring system and cable or conductor structures which will satisfy the requirements of both the code authorities and sound engineering practice, while still giving substantially the economy heretofore sought by those interested in using the bare neutral wire. In other words, it aims to devise a construction that will meet the demands of sound technical requirements at lower cost.

The nature of the invention will be readily understood from the following description when read in connection with the accompanying drawing, and the novel features will be particularly pointed out in the appended claims.

In the drawing,

Figure 1 is a side elevation, with parts in section, of a cable structure embodying features of this invention; and Figs. 2 and 3 are side views, with parts broken away, illustrating other embodiments of the invention.

Preliminary to a detailed description of the various cable structures shown in the drawing, it is pointed out that the present invention solves the problem presented by the conditions above described by grounding the neutral conductor in the usual manner, insulating the other wire or wires of the low voltage distribution circuit adequately to carry the working voltage, but instead of insulating the neutral wire in the same manner as the other or others, protecting it with only approximately enough insulation to prevent any appreciable leakage of current from it. As above stated, this neutral conductor is connected directly to the grounded neutral service terminal, without fuses, so that it cooperates with the latter to form a solid neutral. On open circuit there is no voltage on it. On closed circuit any voltage carried by it is due solely to the voltage drop caused by the flow of current through it. This voltage is very small, usually not over two to five volts. Consequently, the only insulation which it requires to satisfy either the requirements of good engineering or the demands of the factions to the controversy above described is that "sufficient to isolate this small voltage, plus a certain percentage added for safety. The total need not be over five volts for most purposes, and in any event is very much lower than that required for the working voltage.

Referring first to Fig. 1, the cable there shown is similar to the armored type described in United States Patent No. 1,687,013. It comprises two wires 2 and 3, of copper or other suitable metal and of substantially the same diameter, both intended to form parts of the same circuit. One of these wires, namely that shown at 2, is insulated adequately to carry the working voltage. In a typical case such insulation would include an insulating cover 4 and a braided jacket 5. The other wire 3 is intended to serve as the neutral conductor, as above explained, and is lightly insulated, as compared with the insulation of conductor 2. In this particular arrangement both of these conductors, with their individual insulating coverings, are wrapped with fibre, treated paper, tape, or other suitable material, as shown at 7, and the entire assembly may be enclosed in metal sheath or armor 8. At the point where the armor is cut for the purpose of making a connection, a bushing 10 of fibre, or any other suitable insulating material may be inserted.

Fig. 2 shows essentially the same arrangement with the exception that the wrapping 7 and armor 8 have been omitted. Instead, the insulated conductors 2 and 3 are bound together by and enclosed in a sheath consisting of a fibrous insulating wrapping or "serving" 12.

In Fig. 3 the heavily insulated conductor 2 includes a wrapping 13 of fibrous insulating material, outside the jacket 5, and protecting only the conductor 2, and both of these conductors with their independent insulating coverings may be enclosed in a non-metallic fibrous sheath 14 which may conveniently be made in accordance with earlier Patent No. 1,635,829.

The cables shown in Figs. 1, 2 and 3 are, of course, designed for totally different types of service, as will be obvious to those skilled in this art.

It should be understood that in using any of these forms of cables the standard practice at present authorized by the National Electrical code preferably is followed. The conductor 2 carries the usual insulation required in low voltage distributing circuits. The metal sheaths 8 and 15 are grounded in the usual manner and the conductor 3 is connected directly to the grounded neutral of the transformer, without fuses, by means of the neutral terminal and service conductor. In such a wiring system, therefore, the working voltage is insulated exactly as has been customary in prior accepted systems. As will be apparent according to the present invention, the neutral wire 3 does not have the unnecessarily heavy insulation that has been used heretofore, most of which insulation is useless. But it does have insulation adequate for the very low voltage that it carries. Consequently, this wiring is as safe from an electrical standpoint as that heretofore required by the code and it completely avoids the objections to the use of a bare neutral wire.

In addition, it effects an important saving in the expense of manufacture of the cable and thus in the expense of wiring. Such a saving results not only from the cheaper insulation required for the wire 3 and the reduction in the labor and machine cost of applying it, but also in the fact that in such constructions as those shown in the drawing, less material is required for the enclosing sheaths. While the resulting saving per foot of cable is not great, the percentage saving is substantial. Furthermore, when this saving is figured on the millions of feet of cable of these types produced annually, it becomes an extremely important item.

As will be understood by those skilled in this art, the particular cable structures here disclosed are merely illustrative of a great variety of forms in which the invention may be embodied. The number of conductors included in any cable and the kinds and number of the insulating coatings with which they are provided, necessarily will depend upon the requirements of individual uses or services. The foregoing are, however, sufficient to explain the nature of the invention and the principles involved in it.

From the several constructions hereinbefore described, it will be noted that the wire 2 serves to convey the working voltage and the current, and that, consequently, it is insulated or may be insulated by coverings which may not be unlike the coverings or insulations now in common use. The wire 3, which is the grounded neutral wire of the circuit, as will be noted from the above description, and drawing, has a comparatively light insulation of appropriate character, just sufficient to prevent the wire 3 from contact with bare grounded metal parts. The consequence is that the outside diameters of the insulates wires 2 and 3 differ very materially. In other words, the wire 2 has an insulation substantially greater in diameter than the insulation placed on wire 3 so that the two may be assembled, either with or without a sheathing, and present a combined diameter of the two wires substantially less than has been the practice heretofore.

Realizing that in the past the insulating material on wires 2 and 3, for instance, has been of equal diameter, it will be apparent that by the present invention, while securing the purposes of the conductors, will present a combined diameter of the two much less than in the past and enable the two wires to be assembled side by side or one laid upon the other, if desired, while occpying, diametrically considered, less space than in the past.

Having thus described our invention, what we desire to claim as new is:

1. As an article of manufacture an electric cable of the character described comprising two wires of substantially the same diameter adapted to conduct current to and from a current consuming unit, an insulating covering for one of said wires of such diameter and dielectric strength as to enable it to carry the working voltage and to insulate it from both the ground and the other wire, the latter wire serving as the return wire and having an insulating covering of considerably less diameter and lower dielectric strength than that for the first wire but sufficient to insulate it against voltages due to potential drop in it, and a sheath binding said insulated wires together.

2. As an article of manufacture an electric cable of the character described comprising wires of substantially the same diameter adapted to conduct current to and from a current consuming unit, an insulating covering for one of said wires of such diameter and dielectric strength as to enable it to carry the working voltage and to insulate it from both the ground and another wire, the latter wire serving as the return wire and having an insulating covering of considerably less diameter and lower dielectric strength than that for the first wire but sufficient to insulate it against voltages due to potential drop in it, and a sheath binding said insulated wires together.

3. As an article of manufacture an electric cable of the character described comprising two wires of substantially the same diameter adapted to conduct current to and from a current consuming unit, an insulating covering for one of said wires of such diameter and dielectric strength as to enable it to carry the working voltage and to insulate it from both the ground and the other wire, the latter wire serving as the return wire and having an insulating covering of considerably less diameter and lower dielectric strength than that for the first wire but sufficient to insulate it against voltages due to potential drop in it, and a metallic sheath binding said insulated wires together.

WILLIAM C. ROBINSON.
OTTO A. FREDERICKSON.